United States Patent [19]

Stone

[11] 3,754,184

[45] Aug. 21, 1973

[54] REACTIVE POWER COMPENSATION CONTROL SYSTEM

[75] Inventor: David W. Stone, Franklin, Wis.

[73] Assignee: Harnischfeger Corporation, W. Milwaukee, Wis.

[22] Filed: June 21, 1972

[21] Appl. No.: 264,780

[52] U.S. Cl.................. 323/102, 323/21, 323/119, 323/128
[51] Int. Cl. ............................................. G05f 1/68
[58] Field of Search...................... 323/21, 24, 101, 323/102, 108, 119, 128

[56] References Cited
UNITED STATES PATENTS

| | | | |
|---|---|---|---|
| 3,530,370 | 9/1970 | Yamachi et al................. | 323/128 X |
| 3,400,326 | 9/1968 | Zhukov et al................... | 323/119 X |
| 1,993,924 | 3/1935 | Espley............................. | 323/119 X |
| 3,335,318 | 8/1967 | Yancey ........................... | 323/21 UX |
| 3,391,329 | 7/1968 | Meyer............................. | 323/128 X |
| 3,450,983 | 6/1969 | Koppelmann et al............... | 323/119 |
| 3,665,293 | 5/1972 | Keiler et al. ......................... | 323/24 |
| 3,696,288 | 10/1972 | Carman ................................ | 323/21 |

Primary Examiner—A. D. Pellinen
Attorney—James E. Nilles

[57] ABSTRACT

A reactive power compensation control system is provided for a three phase ac electric power supply system which exhibits power factor changes when subjected to large reactive draws by dynamic reactive loads. The control system comprises four capacitor banks switchable in or out of the power system by solid state switches. Each capacitor bank comprises three delta connectible capacitors, one capacitor for each pair of phase lines, and each capacitor is switched by one solid state switch. Each solid state switch comprises a pair of inverse parallel connected SCR's. Each solid state switch is controlled by an individual firing circuit which comprises a charging circuit (for operating the charging SCR) and a discharging circuit (for operating the discharging SCR). All 12 firing circuits are controlled by a control circuit which comprises a KVAR transducer coupled to the power supply system for sensing reactive power conditions therein and ON and RUN circuits which operate the firing circuits.

9 Claims, 6 Drawing Figures

REACTIVE POWER COMPENSATION CONTROL SYSTEM

BACKGROUND OF THE INVENTION

1. Field of the Invention

This invention relates generally to reactive power compensation control systems for multiphase ac electric power supply systems and, specifically, to such control systems wherein capacitors are switched in and out of the power supply system as needed to effect compensation.

2. Description of the Prior Art

Multiphase ac electric power supply systems tend to undergo undesirable reactive power changes when subjected to large reactive draws caused by connection and disconnection of dynamic reactive loads. One type of dynamic reactive load, for example, which causes such changes is a large electric motor used on power shovels and is intermittently connected and disconnected under a variety of operating conditions, such as when loaded or unloaded at full or slow speeds or when plugged. It is necessary, therefore, to provide means for correcting for such reactive power changes so that other electrical equipment on the power supply is not disturbed. Heretofore, reactive power compensation control systems employed capacitors which were switched into and out of the power supply system to effect some degree of reactive power correction in response to the KVAR or reactive draw as measured in the dynamic reactive load. However, such prior art control systems used an "open loop" approached in that they switched in some predetermined amount of capacitance in response to some predetermined amount of reactive draw but did not measure and respond to the effect on reactive power conditions that the amount of capacitance switched in actually had on the power supply system. Such prior art control systems depended on a pre-calculated, probable result and, therefore, achieved only a limited, unpredictable, unrefined degree of reactive power compensation. It is desirable, therefore, to provide improved reactive power compensation control systems which overcome the aforementioned problems and have other advantages.

SUMMARY OF THE INVENTION

A reactive power compensation control system in accordance with the invention for use with a multiphase ac electric power supply system which exhibits undesirable power factor changes when subjected to large reactive draws by a dynamic reactive load utilizes a "closed loop" approach and comprises the following components.

A plurality of capacitor banks are provided and each bank comprises three capacitors, one capacitor for each pair of phase lines, and one solid state switch for each capacitor. Each solid state switch comprises a pair of inverse parallel connected controlled rectifiers, such as SCR's or "Triacs". Each solid state switch is controlled by an individual firing circuit which comprises a charging circuit or section for controlling the charging SCR and a discharging circuit or section for controlling the discharging SCR. All firing circuits are controlled by a single control circuit which comprises a transducer, an ON circuit, and a RUN circuit.

The ON circuit when initially energized effects operation of the charging sections of all firing circuits in a predetermined sequence so as to charge all capacitors and place them in readiness for operation by the RUN circuit. Sequential initial charging of the capacitors prevents a heavy initial draw on the power system by the capacitors themselves.

The transducer is coupled to the power supply system ahead of the connection points of the capacitor banks and the load and continually monitors or senses reactive power (KVAR) conditions in the power supply system and the RUN circuit changes state if the reactive draw on the power supply system is in error more than a predetermined amount.

The RUN circuit effects operation of the charge circuits and discharge circuits of the firing circuits.

In operation, one or more capacitor banks are switched into or out of the power supply system as necessary to maintain balance in response to KVAR conditions sensed by the transducer. The greater reactive power drawn, the more capacitor banks are switched in. As the reactive power drawn decreases and this fact is sensed, capacitor banks are switched out.

As hereinafter explained, all capacitors in one bank are normally charged and discharged synchronously with each other. However, each firing circuit comprises means to prevent firing of its associated SCR's in response to signals from the control circuit unless the voltage differential across the solid state switch is within predetermined magnitude and polarity and, additionally, in response to ON is at the correct time in the applied voltage cycle. Furthermore, the ON and RUN signal transmitting portions of the control circuit are connected to each firing circuit by means of light emitting diode (LED) type optical couplers which provide voltage isolation between the power supply system and the control system.

DESCRIPTION OF A PREFERRED EMBODIMENT

General Description of Components and Operation

Figure 1:
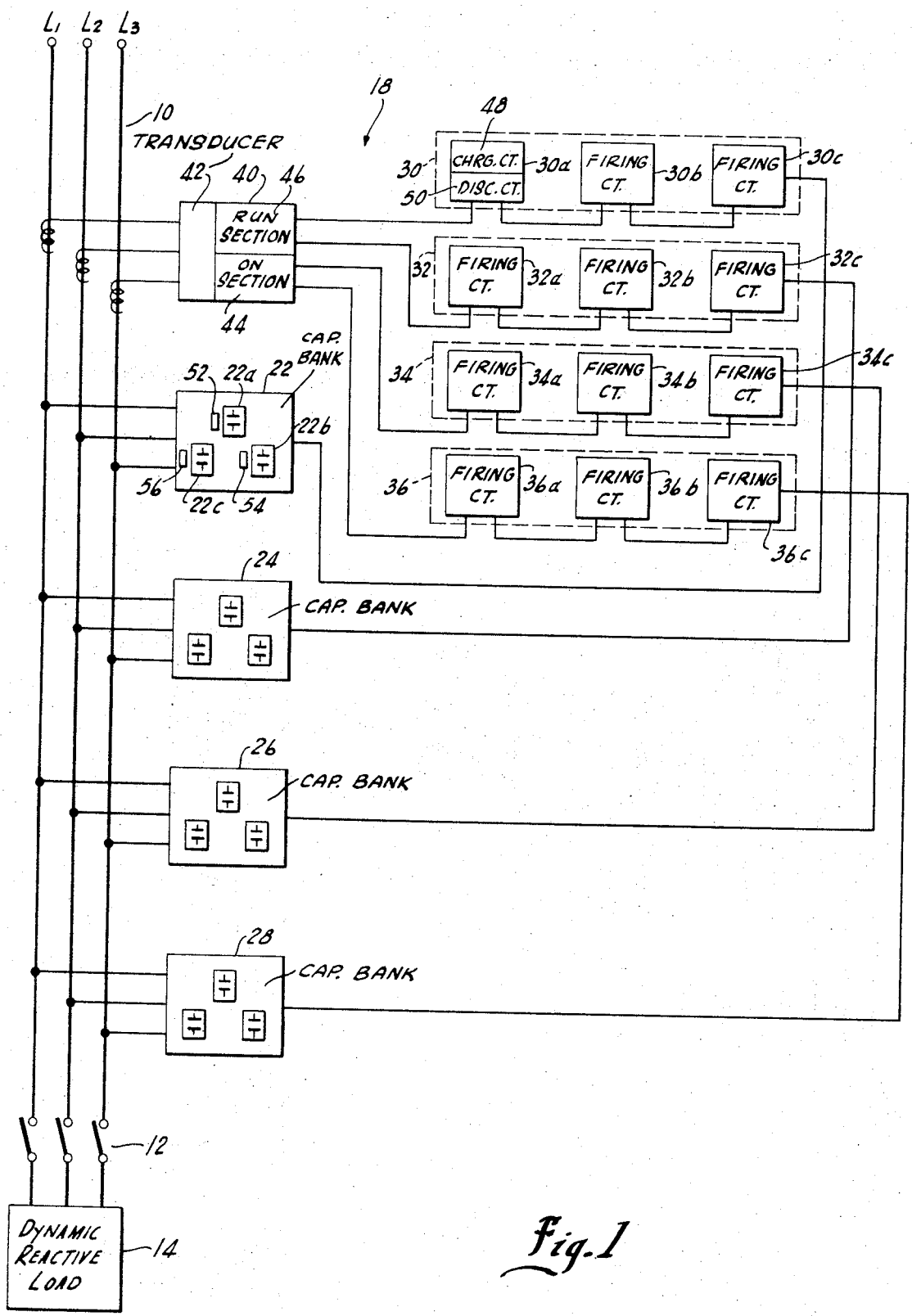
FIG. 1 is a schematic diagram of a reactive power compensation control system in accordance with the invention shown in conjunction with a multi-phase ac electric power supply system.
Figure 5:
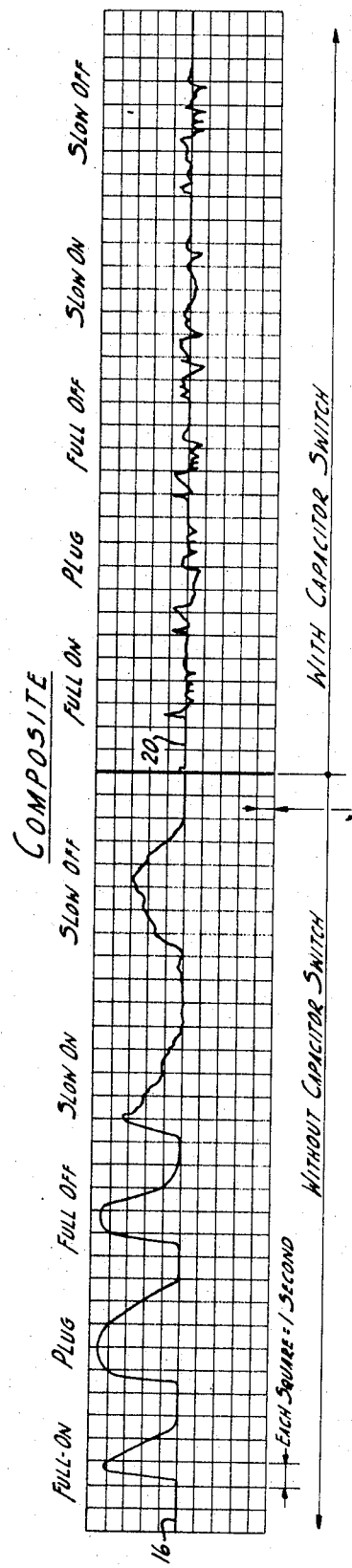
FIG. 5 is a composite graph, based on oscillograph traces, showing reactive power conditions in the ac electric power supply system of FIG. 1 under designated operating conditions of a dynamic reactive load, both without and with capacitor switching in accordance with the present invention.

FIG. 1 shows a multi-phase alternating current electric power supply system 10 comprising three phase line L1, L2, and L3. System 10 is rated, for example, at 600 volts RMS and is connectable through a switch 12 (shown open) to a dynamic reactive load 14, such as a large electric motor. For purposes of this disclosure, it is to be understood that load or motor 14 is connectable and disconnectable by switch 12 to power system 10 at irregular intervals and under a variety of operating conditions. Typical operating conditions are, for example, zero to full speed at the current limit (full-on); full speed forward to zero speed to full speed reverse at the current limit (plugged); full speed to zero at the current limit (full-off); zero to full speed at less than the current limit (slow-on); and full speed at zero at less than the current limit (slow-off). The operating conditions do not necessarily occur in the order listed. The reactive power drawn from the power system 10 under such load conditions, and without capacitor switching, is shown by a curve 16 on the left side of the graph in FIG. 5. The reactive power drawn from the power system 10 under similar load conditions when a power factor correction control system 18 in accordance with the invention is used is shown by a curve 20 on the right side of the graph in FIG. 5.

Power factor correction control system 18 comprises four identical capacitor banks or steps 22, 24, 26, and 28; four identical sets 30, 32, 34, and 36 of firing circuits for the banks 22, 24, 26 and 28, respectively; and a control circuit 40 for the firing circuits. Each set of firing circuits comprises three identical firing circuits.

Control circuit 40 for the firing circuits comprises a transducer 42 which is coupled to power system 10 ahead of the connection points of the capacitor banks 22, 24, 26 and 28 and load 14. Transducer 42 senses reactive power drawn from the power system and provides control signals representative thereof. Control circuit 40 further comprises an ON section 44 for initially effecting sequential charging of capacitor banks 22, 24, 26 and 28. Control circuit 40 also comprises a RUN section 46 for effecting discharging and charging of the capacitor banks by means of the four sets 30, 32, 34 and 36 of firing circuits to achieve reactive power compensation as required.

Each of the four sets 30, 32, 34 and 36 of firing circuits comprises three firing circuits designated 30a, 30b, 30c; 32a, 32b, 32c; 34a, 34b, 34c; and 36a, 36b and 36c, respectively. Each of the 12 firing circuits comprises a charging circuit and a discharging circuit, such as those designated 48 and 50, respectively, for firing circuit 30a.

Each of the four capacitor banks 22, 24, 26 and 28 comprises a set of three delta-connectable capacitors, such as those designated 22a, 22b and 22c in capacitor bank 22. Each capacitor bank also comprises or has associated therewith a solid state switch means for each capacitor, such as the switch means 52, 54 and 56 for the capacitors 22a, 22b and 22c, respectively, of capacitor bank 22.

Figure 3:
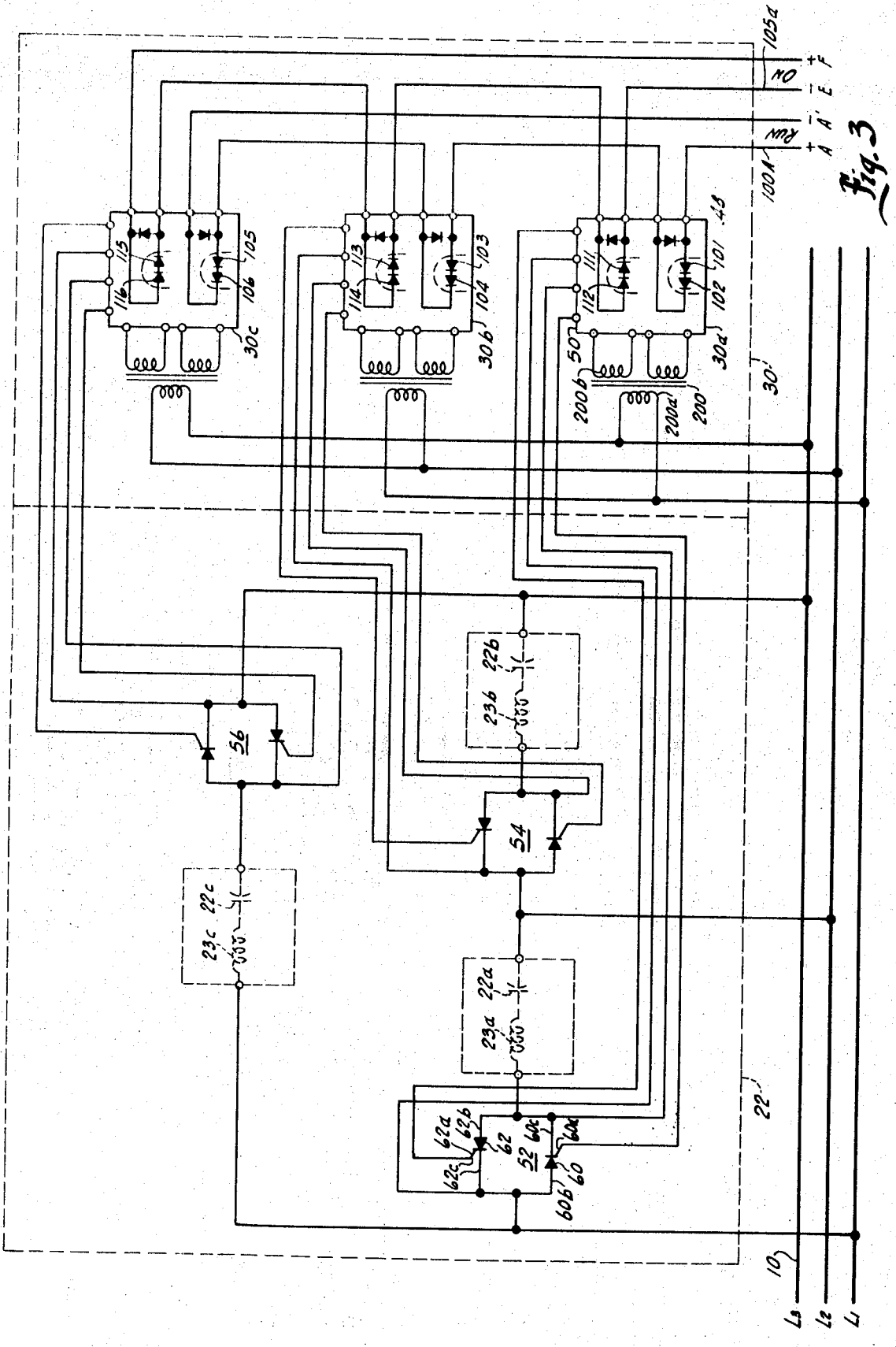
FIG. 3 is a circuit diagram, partly in schematic form, of three firing circuits and three capacitor banks shown in FIG. 1.

Each solid state switch means 52, 54 and 56 (and all others) comprises a pair of inverse parallel connected controlled rectifiers or SCR's, such as a capacitor charge rectifier 60 and a capacitor discharge rectifier 62 of switch means 52, as FIG. 3 shows.

In operation, initial energization of ON section 44 of control circuit 40 effects sequential operation of each charge section 48 of the firing circuit sets 30, 32, 34 and 36 to cause sequential charging of all capacitors in the banks 22, 24, 26 and 28, respectively. Thereafter, changes above a certain magnitude in KVAR or reactive power conditions in power system 10 are sensed by transducer 42 of control circuit 40 and cause control signals from the latter to operate RUN section 46. RUN section 46, in turn, transmits its control signals to the sets of firing circuits 30, 32, 34 and 36 to cause discharge of one or more capacitor banks 22, 24, 26 and 28. Upon discharge of a capacitor, it is immediately recharged in response to operation of the charge circuit of its firing circuit. However, no capacitor can charge or discharge unless the voltage across the anode and cathode of an appropriate SCR therefor is within predetermined relatively low limits, i.e., between +38 and +74 volts.

Charge and discharge of each capacitor, i.e., firing of each SCR, takes place with respect to voltage conditions in lines L1, L2 and L3 of power supply system 10. This relationship is shown graphically in FIG. 6 wherein the voltage levels between the power lines L1, L2 and L3 are represented by curves designated AB, AC, BC, BA, CA and CB and the reactive power conditions between the power lines are represented by curves designated AN, BN and CN.

THE CONTROL CIRCUIT

Figure 2:
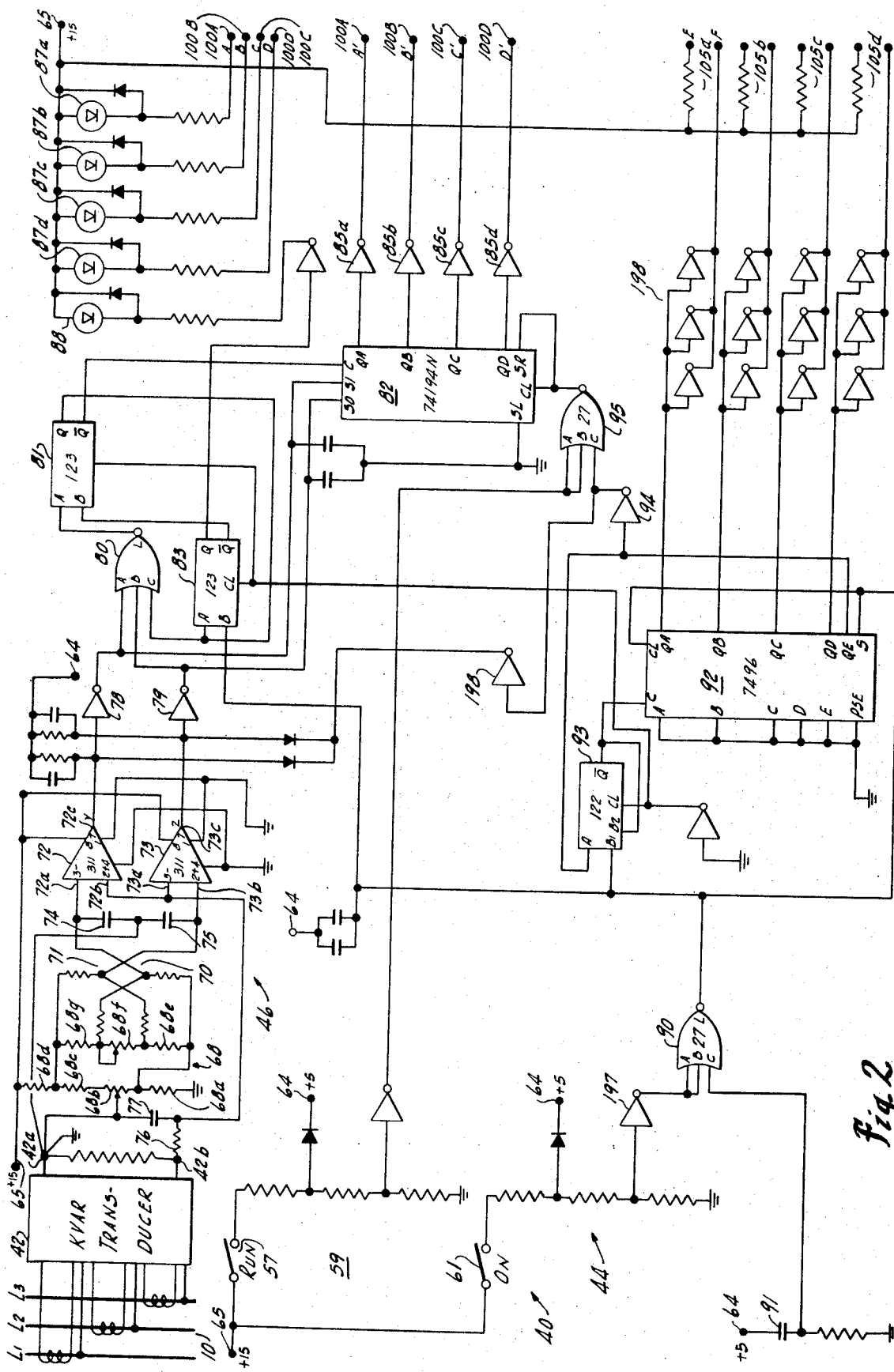
FIG. 2 is a circuit diagram of the control circuit of the control system shown in FIG. 1.

FIG. 2 shows details of control circuit 40 which comprises a transducer 42, ON section or circuit 44 and RUN section or circuit 46. Transducer 42 is a conventional device for measuring KVAR conditions in a three phase power system and provides an output signal proportional to such conditions at its output terminals 42a and 42b. The value of the output signal across terminals 42a and 42b can range, for example between 0 and 150 millivolts (plus or minus voltage) depending on the magnitude and direction on the reactive draw on power system 10. The output signal across terminals 42a and 42b is, in fact, the sum of the instantaneous produce of line currents and voltages lagging the line to neutral voltages by 90° in power system 10, and this sum is proportional to reactive current or reactive draw.

ON section 44 and RUN section 46 of control circuit 40 are energized from a conventional commercially available DC power supply 59 for integrated circuitry. Power supply 59 comprises an ON section switch 61 and a RUN section switch 57 both shown open, but which are closed and remain closed during operation of control system 18. Power supply 59 also includes a number of terminals, designated by numeral 64, at which a +5 DC voltage appear and includes a number of terminals, designated by numeral 65, at which a +15 DC voltage appears. Some terminals 64 and 65 are decoupled to avoid transient voltage and spurious signal problems.

The output signals across grounded output terminal 42a and output terminal 42b of transducer 42 are supplied to a resistance network 68 comprising wing resistor 68a, a variable resistor 68b, resistor 68c and wing resistor 68d connected across power output terminal 65 (+ 15 V) and common. Variable resistor 68b and resistor 68c provide a stablized 100 millivolt standard or reference voltage against which the output signal from transducer 42 is measured. Resistance network 68 further comprises resistor 68e, rheostat 68f, and resistor 68g, which are series connected with each other in parallel with resistors 68b and 68c. With all resistance of rheostat 68f in circuit, the output terminals 70 and 71 of resistance network 68 are close together voltagewise. Conversely, removal of some or all resistance of rheostat 68f from the circuit moves terminals 70 and 71 apart voltagewise. For noise reduction (i.e., stabilization)purposes, the output terminals 70 and 71 are coupled through capacitors 74 and 75, respectively, to grounded output terminal 42a of transducer 42.

The output terminal 70 of resistance network 68 is connected to the negative input terminal 72a of a crossing detector device 72. The output terminal 71 of resistance network 68 is connected to the positive input terminals 73b of a crossing detector device 73. The crossing detectors 72 and 73 are type 311 integrated circuit operational amplifiers, each used in the dual input, single output mode. The output terminal 42b of transducer 42 is connected to positive input terminal 72b of crossing detector 72 and to negative input terminal 73A of crossing detector 73. An R-C network conprising resistor 76 and a capacitor 77 filters some of the noise that may be coupled through the transducer 42 and into crossing detectors 72 and 73.

The crossing detectors 72 and 73 have output terminals 72c and 73c, respectively, which provide output signals in response to KVAR conditions in power system 10 sensed by transducer 42. For example, with no disturbance in power system 10, input terminal 72a of crossing detector 72 is more negative than input terminal 72b and an output signal appears at output terminal 72c. Simultaneously, input terminal 73a of crossing detector 73 is more negative than input terminal 73b and an output signal appears at output terminal 73c. When inductive reactive power is drawn from system 10, terminal 72c remains positive and terminal 73c goes to common.

The output terminals 72c and 73c of the crossing detectors 72 and 73 are connected through NOT gates 78 and 79, respectively, which effect signal inversion, to the A and B inputs of a three input NOR gate 80. With no disturbance in power system 10, the input terminals A, B and C of NOR gate 80 are each at 0 and output terminal L is at 1.

Terminal L of NOR gate 80 is connected to terminal A of integrated circuit device 81 which is a dual retriggerable one-shot multivibrator, each side of which has only one stable state, i.e., is not free-running and remains in a given condition until triggered by an input pulse. With terminal A of device 81 at 1, no action results. However, in the event of a transition condition in power system 10 which causes a change in state of at least one input terminal A or B of NOR gate 80, terminal L of gate 80 and terminal A of device 81 go to 0. This triggers operation of device 81 which is understood to have a response time of about 1 microsecond. When device 81 is so triggered, its terminal Q goes to 1 and its terminal $\overline{Q}$ goes to 0. Terminal $\overline{Q}$ of device 81 is connected to clock terminal C of an integrated circuit device 82 which is, for example, a type 74194 N four bit right-left shift register. When, after the predetermined interval, terminal C of device 82 makes a transition from 0 to 1 device 82 will effect operation of components hereinafter described.

Terminal Q of device 81 is connected to terminal A of the second half 83 of the dual retriggerable one-shot multivibrator integrated circuit device 82. Since, as hereinbefore described, terminal Q of device 81 made a transition to the 1 state, terminal A of device 83 also goes to 1 and resets device 83.

The input signal to terminal B of NOR gate 80 also goes to the SO input terminal of shift register 82 and causes the latter to try to count or shift right. At the end of the 1 micro-second time interval, the $\overline{Q}$ of device 81 goes to 1, as does clock terminal C of shift register 82, to cause shift register 82 to shift. Simultaneously, multivibrator 83 starts to time. The output from terminal $\overline{Q}$ of device 83 goes to the input terminal B of device 81 and disables the latter, whereupon its output remains at 0 for a time T1 which can be approximately 11 milliseconds, regardless of the input to terminal A of device 81 for the time interval $T_1$. Device 81 does not trigger again until its terminal B goes to 1 (1) and terminal A goes to 0.

Referring again to shift register 82, the 1 on its input terminal SO causes it to shift right when its clock turn C goes to 1. Since it has a 1 input signal on its shift right input terminal SR, its output terminal QA goes to 1. This latter output is inverted through a hex inverter 85a.

Hex inverter 85a is one of a series of four open collector hex inverters 85a, 85b, 85c, and 85d connected to output terminals QA, QB, QC and QD, respectively of shift register 82. A 1 on the input of the hex inverter grounds its output and grounding thereof causes current flow from + 15 volt power supply terminal 65 through one of four light emitting diodes 87a, 87b, 87c and 87d to energize one of the four output terminals A, B, C and D of four RUN signal circuits 100A, 100B, 100C and 100D, respectively. The other side of the RUN circuits 100A, 100B, 100C and 100D are connected to output terminals $A^1$, $B^1$, $C^1$ and $D^1$, respectively, as shown in FIG. 2.

Current flow through the RUN circuits 100A, 100B, 100C and 100 D tends to effect operation of the firing circuits associated therewith, as hereinafter described, to fire the SCR's controlled thereby in a sequential order. It is to be understood, therefore, that operation of the RUN circuits is a function of KVAR conditions in power system 10. If a reactive power error continues to exist for time interval $T_1$ after the connection of a capacitor bank to power system 10, sequential excitation of the RUN circuit continues through the action of shift register 82 until a 1 signal appears at terminal 73C signifying a lock of position error. When the reactive power drawn decreases, a negative error situation exists whereby operation is in response to signals from crossing detector 72. Signals from crossing detector 72 feed to shift-left shift register 82 to cause deenergization of RUN circuit 100 sequentially until the negative error ends.

FIG. 2 shows that ON circuit 44 of control circuit 40 comprises a NOR gate 90, similar to NOR gate 80 hereinbefore described. Energization of ON circuit 44 by closure of ON switch 61 forces a 1 onto the input of hex inverter 197 which forces a 0 on input terminals A, B and C of NOR gate 90. Terminal C of NOR gate is energized with a short 1 when power is turned on because of the charging current from capacitor 91 which charges rapidly when the power is first turned on. Any 1 forces a 0 at terminal L of NOR gate 90, which is connected to clear terminal CL of integrated circuit device 92, thereby clearing the latter device. The latter device is a type 7496 5 bit shift register. The 0 at terminal L of NOR gate 90 also forces a 0 onto the input terminal B1 of an integrated circuit device 93, which is a type 7496N single retriggerable one-shot multivibrator. The 0 at terminal L of NOR gate 90 also forces a 0 on the B input terminal of device 83. However, the 0 input to terminal C of NOR gate 90 lasts (as a minimum) only about 1 microsecond (i.e., the charge time of capacitor 91), whereupon the zero output at terminal L of NOR gate 90 changes to a 1, if the ON switch 61 is closed.

A 0 output from NOR gate 90 into the CL input of shift register 92 forces a 0 on all Q outputs of shift register 92. The 0 on terminal QE goes to the input to a hex inverter 94. This, in turn, forces a 1 on the output from hex inverter 94 to the input terminal C of a NOR gate 95. The 0 output from NOR gate 95 forces a 0 on the clear terminal CL of shift register 82 and this, in turn, forces all the Q outputs of shift register 82 to zero. The A input of device 93 is also zero. However, after the end of a 1 microsecond interval (assuming that ON switch 61 is closed), there will be a 0 input on each of the three input terminals of NOR gate 90 and its output terminal will go to 1. As a result, input terminal B1 of device 93 goes to a 1, the clear terminal CL of shift register 92 goes to 1 and its serial input terminal S goes to a 1 also, It should be noted that the characteristic of device 93 is that its terminals B1 and B2 must both be 1 for it to trigger. When it triggers, $\overline{Q}$ goes to 0 and also forces a 0 on terminal B2. This condition exists for about one-fourth of a second (about 15 cycles in the 60 cycles AC power system 10). However, every time $\overline{Q}$ of device 93 goes to a 1 it triggers shift register 92 to shift right. Thus, output terminal QA is first forced to 1. On the next operation of device 93, the 1 appears on terminal QB of shift register 92, and so on.

As each output terminal QA through QD of shift register 92 is forced to 1, it effects turn-on of an associated ON circuit 105a, 105b, 105c and 105d, respectively, to effect sequential initial charging of the capacitor banks 22, 24, 26 and 28. Charging time alloted for each bank is 15 cycles or one-fourth of a second. Terminals QA through QD of shift register 92 are connected to the ON circuits through a bank 198 of hex inverter.

When output terminal QE of shift register 92 finally goes to 1, it forces input A of device 93 to 1 and disables device 93. Inverter 94 then forces a 0 on terminal C of NOR 95 to clear it. Up until this time, multivibrator 83 continues to fire at 11 millisecond intervals because the outputs of the crossing detectors 72 and 73 were grounded by the open collector inverter 198. However, with a 1 on C of 95 they are allowed to go to the condition sensed by transducer 42. As device 83 continues to fire repetitively, the light emitting diode 88 continues to light up, indicating that the system is charging the capacitor and when the error light 88 goes out (in response to appearance of a 1 output at terminal QE of shift register 92 and a 0 at the output of device 94) the system is ready to run. When and if the RUN switch 57 is closed, 0 is applied to inputs A and B of NOR 95. With all inputs to NOR gate 95 at zero, its output is a 1 which forces a 1 on clear terminal CL of shift register 82 and the latter is in readiness for operation in response to signals from transducer 42.

CAPACITOR BANKS

FIG. 3 shows set 30 comprising the three firing circuits 30a, 30b, 30c which control operation of capacitor bank 22 in response to control signals from control circuit 40 hereinbefore described. It is to be understood that the other sets of firing circuits, namely 32, 34 and 36, and the other capacitor banks 24, 26 and 28 are similar in construction and mode of operation.

The RUN signal circuit 100A connected across the pair of RUN signal output terminals A and A' of control circuit 40 described in connection with FIG. 2 has six light emitting diodes (LED) 101, 102, 103, 104, 105 and 106 connected in series circuit therein to serve as optical couplers for supplying RUN signal information from RUN circuit 46 (FIG. 2) to firing circuits 30a, 30b, and 30c. Each of the other three RUN circuits 100B, 100C, and 100D is understood to be similarly provided with six series-connected LED's. In RUN circuit 100A, the diodes 101 and 102 when energized transmit or supply RUN signal information to firing circuit 30a; diodes 103 and 104 supplying firing circuit 30b; and diodes 105 and 106 supplying firing circuit 30c.

The ON signal circuit 105a connected across the pair of ON signal output terminals E and F of control circuit 40 described in connection with FIG. 2 has six light emitting diodes (LED's) 111, 112, 113, 114, 115 and 116 connected in series circuit therein to serve as optical couplers for transmitting or supplying ON signal information from ON circuit 44 (FIG. 2). Each of the other three ON circuits 105b, 105c, 105d is understood to be similarly provided with six series connected LED's. In ON circuit 105a, the diodes 111 and 112 when energized transmit or supply ON signal information to firing circuit 30a; diodes 113 and 114 supply firing circuit 30b; and diodes 115 and 116 supply firing circuit 30c.

Firing circuits 30a, 30b and 30c operate or control the solid state switches 52, 54 and 56, respectively, which control or switch the capacitors 22a, 22b and 22c, respectively.

The capacitors 22a, 22b and 22c have one side permanently connected to the lines L2, L3 and L1, respectively, of power system 10. The other sides of the capacitors 22a, 22b and 22c are connectable to the lines L1, L2 and L3, respectively, through the solid state switches 52, 54 and 56, respectively. It is to be understood that the capacitor banks 24, 26 and 28 are similarly constructed and connected to power supply system 10.

The capacitors 22a, 22b and 22c are in series circuit with reactances 23a, 23b and 23c, respectively, which filter out or block all harmonics above the fourth harmonic, for example.

Solid state switch 52 for controlling capacitor 22a comprises a charging SCR (silicon controlled rectifier) 60 and a discharging SCR 62 which are connected in inverse parallel relationship with each other in series circuit between line L1 of power system 10 and capacitor 22a. All other solid state switches for the capacitor banks are similar to switch 52.

Referring to discharge SCR 62, it is seen that its anode 62b is connected to the cathode of charge SCR 60 and to capacitor 22a. All other solid state switches in the system are similarly arranged and connected to their respective capacitors and to power supply system 10.

When charge SCR 60 is fired by a signal to its gate from charge section 48 of firing circuit 30a, current flows from line L1, through the SCR, and through coil 23a (and from line L2) to charge capacitor 22a. Conversely, when discharge SCR 62 is fired by a signal to its gate 62a from discharge section 50 of firing circuit 30a, current flows from capacitor 22a, through coil 23a, and through SCR 62 to line L1 (and to line L2) to discharge capacitor 22a. All other capacitors in the system are charged and discharged in the same manner.

In normal operation, all capacitors 22a, 22b, 22c in bank 22 are charged and discharged simultaneously. As hereinbefore mentioned, the capacitor banks 22, 24, 26 and 28 are initially charged in a sequence determined by ON section 44 of control circuit 40. Thereafter, discharge of a particular capacitor bank is controlled by RUN section 46 of control circuit 40. Only as many banks are fired as is necessary to achieve power factor correction. Firing order is determined by output signals from terminals QA through QD in shift register 82 in control circuit 40. With a RUN signal the discharge SCR is fired first and during RUN, both SCR's are fired in order. And, when appropriate, and when RUN is de-energized, the charge SCR is fired last leaving the capacitor charged and ready for the next RUN signal. However, charge or discharge of any particular capacitor in a bank does not occur unless the anode-cathode voltage across the SCR controlling that operation falls within a predetermined range.

Set forth below is a schematic explanation of the logic rules which are required to effect firing of one capacitor in one capacitor bank. In the explanation ● signifies AND; + signifies OR; and ⁻ signifies NOT. It is to be noted, however, that the charge and discharge sections of a firing circuit do not effect firing of their associated SCR's if anode-cathode voltage of an SCR is above or below a range, for example, of +5 and +100 volts.

| TRANSITION | ACTION |
|---|---|
| | Charging SCR |
| (ANY) → $\overline{ON}$ | Do not fire. |
| ON → ON ● RUN | Fire when anode-cathode potential decreases to > +5 < +100 volts. |
| ON ● RUN → ON ● RUN | Fire when anode-cathode potential > +5 < +100 volts. |
| ON ● RUN — ON ● $\overline{RUN}$ | Revert firing pattern just before anode is most positive |
| | Discharging SCR |
| (ANY) → $\overline{ON}$ | Do not fire. |
| $\overline{ON}$ → ON ● $\overline{RUN}$ | Do not fire. |
| ON ● $\overline{RUN}$ — ON ● RUN | Fire when anode-cathode potential > +5 < +100 volts |
| ON ● RUN → ON ● $\overline{RUN}$ | Revert firing pattern just before cathode is most positive |

FIRING CIRCUIT

Figure 4:
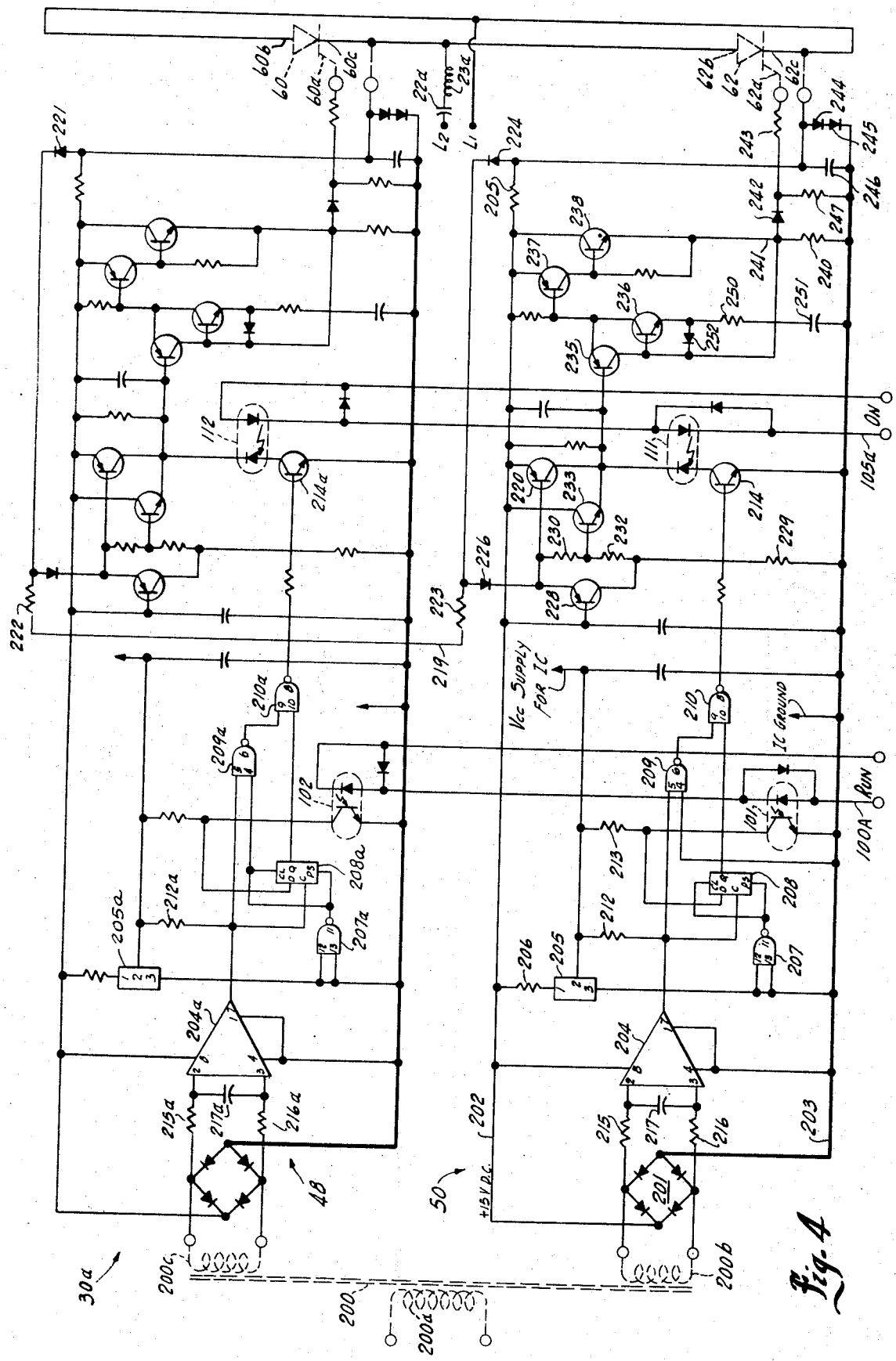
FIG. 4 is a circuit diagram of one of the firing circuits shown in FIGS. 1 and 3.

FIG. 4 shows details of firing circuit 30a which is identical in construction and operation to all other firing circuits. Firing circuit 30a comprises a charging section or circuit 48 for controlling SCR 60 and a discharging section or circuit 50 for controlling SCR 62. Section 48 and 50, which are identical to each other except as regards connection of an input terminal B of a NAND gate 209 therein, are supplied with power (and certain signal information) from a transformer 200 which has its primary winding 200a connected across lines L3 and L3 of power system 10. A secondary winding 200b of transformer 200 supplies discharging section 50 of firing circuit 30a and a secondary winding 200c supplies charging section 48.

Since circuits 48 and 50 are identical, except as hereinafter noted, only components in circuit 50 will be identified and described but it is to be understood that circuit 48 comprises similar components. Circuit 50 comprises a rectifier bridge 201 connected across secondary winding 200b of transformer 200. A positive nominally 15 volt DC buss line 202 and a negative or ground buss line 203 are connected to the output terminals of rectifier bridge 201. A voltage comparator device 204, such as a type NSLM311 integrated circuit differential amplifier, has its input terminals 2 and 3 connected across secondary winding 200b of transformer 200 and is responsive, therefore, to sinusoidal conditions in lines L1 and L3 of power system 10. Power terminals 4 and 8 of device 204 are connected to buss lines 203 and 202, respectively, and its terminal 1 is connected to terminal 4. A voltage regulator device 205, such as a type NSLM309 integrated circuit, is connected at its terminals 1 and 3 in series with a voltage dropping resistor 206 across buss lines 202 and 203.

Discharging circuit 50 further comprises a logic section comprising a NAND gate 207, such as contained in a type T1 SN7400 quadruple 2-input positive NAND gate integrated circuit; a flip-flop device 208 such as contained in a Type T1 SN7474 dual D-type edge-triggered flip-flop integrated circuit; and two additional NAND gates, similar to gate 207, designated 209 and 210. As FIG. 4 shows, input terminals 12 and 13 of NAND gate 207 are connected to buss line 203. Output terminal 11 of gate 207 is connected to clear terminal CL and terminal PS of flip-fl'p device 208 to supply a good logical 1 to these terminals.

It is to be noted in charging circuit 48 of firing circuit 30a that output terminal 11 of NAND gate 207a is also connected to input terminal 4 of NAND gate 209a. In discharging circuit 50 input terminal 4 of NAND gate 209 is connected to buss line 203. As a result of this difference between circuits 48 and 50, the the 210a output follows the 204a output while 210 output remains at 0 when the RUN signal is de-energized.

The output terminal 7 of comparator 204 is connected to input terminal C of flip-flop device 208; to input terminal 5 of NAND gate 209; and through a resistor 212 to output terminal 2 of regulator 205. Input terminal D of flip-flop device 208 is connected to a point in a circuit between a dropping resistor 213 and optical coupler 101. Output terminal 6 of NAND gate 209 is connected to input terminal 9 of NAND gate 210. Input terminal 10 of gate 210 is connected to output terminal Q of flip-flop device 208.

Figure 6:
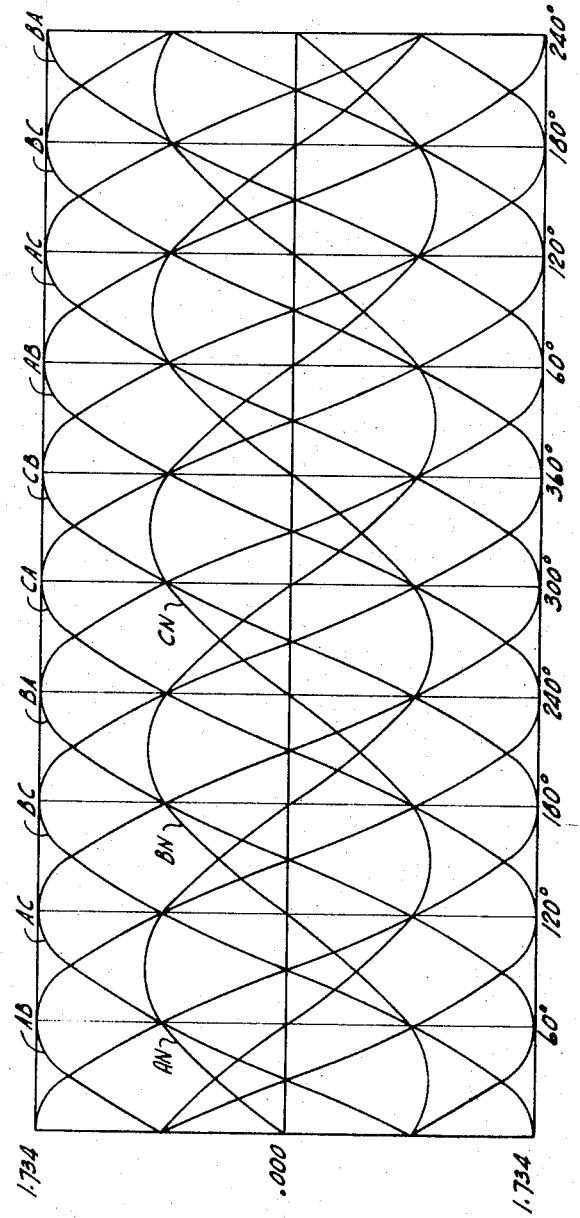
FIG. 6 is a graph on which is plotted, first, the line-to-line voltage between the supply lines in the ac electric power supply system shown in FIG. 1 and, second, the voltage between each line and neutral.

In operation, RUN circuit 100A is energized from control circuit 40 and optical coupler devices 101 and 102 connect the logic sections of charging circuit 48 and discharging circuit for RUN operation. Provision of an output signal at output terminal 8 of NAND gate 210a of charging circuit 48 effects operation of a transistor 214a in a portion of the circuit hereinafter described. Whether or not an output signal appears at terminal 8 of NAND gate 210a is a function of line voltage between lines L1 and L3 of power system 10 and the RUN signal. Furthermore, charging section 48 only effects firing of its associated SCR 60 in the event that transistor 214a is made active by ON circuit 105a. As the graph in FIG. 6 shows, when circuit sinoid line AB is going toward peak positive, line CA is going toward zero. Thus, line CA is zero at 30° before line AB reaches peak positive voltage, i.e., before SCR 60 has peak voltage on its anode. These voltage conditions appear in secondary winding 200c of transformer 200 (which is connected across the lines L1 and L3, i.e., lines A and C). Thus, input voltage to terminals 3 to 2 of comparator 204a is going through zero at an interval 30° before peak positive voltage appears on the anode of SCR 60. Then, line L1 starts to go positive with respect to line L3 and causes terminal 2 on comparator 204a to start to go positive with respect to terminal 3 (although an R-C circuit comprising resistors 215a and 216a and a capacitor 217a introduce a delay of about 3°, for example). As terminal 2 of comparator 204a goes positive with respect to terminal 3, output terminal 7 of comparator 204a will tend to go positive due to the pull up effect of resistor 212a. As this occurs, the signal condition of D of 208a is transferred to Q. If D is and has been a 1 because of the absence of a RUN signal, Q of 208 remains a 1 but a 1 on both inputs 209a forces a 0 output which into 210a forces a 1 output for the time that 204a output remains a 1 (180°). When this occurs, the firing circuit for SCR 60 is turned on for an interval of 180°.

Circuit 50, because terminal 4 of 209 is connected to buss 203, will not have the output of 210 follow the output of 204 in the absence of the RUN signal.

In the presence of a RUN signal, both circuits 48 and 50 act the same. A RUN signal forces a 0 on the D input of 208. When 7 of 204 has a transition from a 0 to a 1, the 0 on terminal D is transferred to terminal Q. This 0 being an input to NAND 210 forces a 1 on its output. This condition will remain until the RUN is de-energized, forcing D input to a 1 and positive transition out of 204 transfers the D data to Q. At this time, circuits 48 and 50 resume the action hereinbefore described.

Discharging circuit 50, in addition to a logic section, also comprises an amplification section for effecting operation of SCR 62 in response to signals from the logic section, provided ON circuit 105a is energized and anode-cathode voltage conditions across the SCR's 60 and 62 are within certain limits.

The amplification section comprises a NPN transistor 214 which has its emitter-collector circuit connected in series with the light-receiving diode of optical coupler 111 and the emitter-collector-circuit of a PNP transistor 220 across the buss lines 202 and 203. Energization of ON circuit 105a excites optical coupler 111 and connects transistors 214 and 220 for operation, as hereinafter described.

As FIG. 4 shows, the anode 60b of SCR 60 and the cathode 62c of SCR 62 are both connected to line L1 of power supply 10. Also, the anode 62b and the cathode 60c are both connected to each other and to a side of capacitor 22a (through coil 23a). The cathode 60c of SCR 60 is connected by a conductor 219 through a diode 221, a resistor 222, a resistor 223 and a diode 224 to the cathode 62c of SCR 62. Conductor 219 is connected through a diode 226, through the emitter-collector circuit of a PNP transistor 228, and through a resistor 229 to grounded buss line 203 of discharging section 50 of firing circuit 30a. A voltage divider comprising resistors 230 and 232 is connected across the emitter-collector circuit of transistor 228. The base of an NPN transistor 233 is connected to a point between the resistors 230 and 232.

Thus, conductor 219 and the components associated therewith are at the same voltage level as the cathode 60c of SCR 60. If there is no voltage difference between diode 226 and cathode 60c current will flow from line 202, through transistor 220 and from the base of the latter transistor, through resistors 230, 232 and 229 to grounded buss line 203. This current flow causes transistor 220 to turn full on and keeps the base of a PNP transistor 235 shorted to positive buss lines 202.

Transistor 235, NPN transistor 236, and NPN power transistors 237 and 238 together serve as an amplifier circuit for the output signal from transistor 233 to transistor 235. In operation, when the base of transistor 235 goes negative with respect to positive buss line 202 (i.e., about 1.7 volts), it turns on sufficiently to turn on transistor 237 which begins to bring up the base voltage on transistor 238. Transistor 238 then begins to draw power through a resistor 240 connected in series therewith between buss lines 202 and 203.

A resistor 250 and a capacitor 251 are connected in series with emitter- collector circuit of transistor 236 and a diode 252 is connected across the base-emitter circuit of transistor 236. This serves as a forcing circuit whereby, when current flow beings to flow from line 202 to the base of transistor 237, transistor 237 will remain on for about 200 microseconds, for example, regardless of the signal output from transistor 235. Changes in the value of the R-C circuit comprising capacitor 251 and resistor 250 changes the time interval for operation of transistor 237.

As FIG. 4 shows, gate 62a of SCR is connected to a point 241 in the emitter- collector circuit of transistor 238 through a diode 242 and a resistor 243. Gate 62a is biased to a negative potential (when no gating signal is present) by means of resistor 205 and the diodes 244 and 245 in series therewith across the buss lines 202 and 203. A capacitor 246 is connected in parallel with the diodes 244 and 245. A resistor 247 is connected from a point btween diode 242 and resistor 243 and grounded buss line 203.

Operation of transistor 238 provides a very sharp-rising turn-on or gate signal for gate 62a of SCR 62.

Referring again to diode 226, current flow therethrough (and voltage thereat) begins to increase when the voltage on anode 62b of SCR 62 starts to go positive. When the voltage level of diode 226 becomes greater than that of positive buss line 202, it causes the base of transistor 233 to become more positive than its emitter. This again causes the base of transistor 235 to be shorted to buss 202. Thus, there is a voltage range determined by the ratio of the values of the resistors 230 and 232 wherein firing of the SCR 60 and 62 can occur and above or below which firing cannot occur.

As voltage continues to increase, the emitter of transistor 228 will become slightly more positive than its base (which is connected to buss 202) and current will begin to flow through transistor 228 and resistor 229 keeping transistor 233 "on", and when 228 becomes saturated the excess base current is conducted through the base-emitter junction to the buss 202.

OPERATION

Power factor correction control system 18 operates as follows. Assume that switch 12 is open and that load 14 is disconnectd from power system 10. Further assume that the ON switch 61 and the RUN switch 57 in control circuit 40 are both closed and that closure of ON switch 61 has effected charging of all capacitors in all capacitor banks.

Now assume that closure of switch 12 causes a change or disturbance in reactive power conditions in power system 10 because of the nature of dynamic reactive load 14 and that this change is sensed by transducer 42 of control circuit 40. If the reactive power increases to above a minimum predetermined magnitude, RUN section 46 of control circuit 40 energizes RUN circuit 100A. Energization of RUN circuit 100 A effects simultaneous operation of each capacitor section in the firing circuits 30a, 30b and 30c in set 30 by forcing a 0 on each D terminal of each device 208. As each phase to phase voltage goes through the particular zero transition each associated voltage comparator 204 has a 0 to 1 transition turning on the 214 transistor. Each capacitor discharge section (such as discharge section 50 for firing circuit 30a) causes its associated discharge SCR (such as discharge SCR 62) to fire (if the voltage is correct) and discharge its associated capacitor (such as capacitor 22a). Thus, all capacitors 22a, 22b and 22c in capacitor bank 22 discharge synchronous to the line. Since all the 214 transistors are energized in pairs, when the current extinguishes after discharge of each capacitor bank section 22, the voltage reversal causes each capacitor charge control circuit (such as charge section 48 for firing circuit 30a) to fire its associated charge SCR (such as charge SCR 60) and effect recharging of its associated capacitor.

Transducer 42, which continuously monitors power supply system 10, senses the effect of the connection of capacitor bank 22. If transducer 42 senses that connection of capacitor bank 22 caused a change in reactive power conditions of sufficient magnitude in power system 10, no further capacitor banks are connected. However, if the change in reactive power is still not brought below a predetermined magnitude, additional capacitor banks are connected until transducer 42 senses that necessary correction has occurred.

I claim:
1. In combination:
a source of alternating current; a dynamic reactive load; at least one pair of phase lines connected between said source and said load;
a plurality of capacitors for connection to said phase lines;
a plurality of switches for connecting said capacitors to said phase lines, one switch being provided for each capacitor and each switch comprising one pair of inverse parallel controlled rectifiers;
a plurality of firing circuits for operating said switches, one firing circuit being provided for each switch and each firing circuit comprising a charge section for controlling one rectifier and a discharge section for controlling the other rectifier;
and a control circuit coupled to said phase lines between said source and said capacitors and responsive to changes in reactive power conditions in said phase lines resulting from said dynamic reactive load and from the affect of said capacitors for operating said firing circuits,
said control circuit comprising an ON section for effecting sequential operation of said charge sections and sequential initial charging of said capacitors to place them in readiness for use,
said control circuit further comprising a RUN section operable in response to said changes in reactive power conditions for effecting synchronous discharge and charge of said capacitors subsequent to their initial charging,
said control circuit further comprising means responsive to the magnitude of said changes in reactive power conditions to control the number of capacitors connected for discharge to said phase lines.

2. A combination according to claim 1 wherein each of said firing circuits includes means responsive to the magnitude and polarity of the voltage across its associated switch during operation of either said ON or said RUN sections to prevent operation of said switch regardless of said change in reactive power conditions while the voltage differential across said switch is beyond a predetermined range, and wherein each of said firing circuits further includes means to prevent operation of its associated switch during operation of said ON section unless the voltage across said switch is at a predetermined phase angle with respect to the applied voltage in the cycle.

3. A combination according to claim 2 including optical coupling means connected in circuit between said control circuit and said firing circuits for transmitting signal information from said control circuit to said firing circuits while maintaining a predetermined level of voltage isolation therebetween.

4. A combination according to claim 1 wherein three phase lines are connected between said source and said load and wherein a plurality of capacitors are connected between each pair of phase lines.

5. A combination according to claim 2 wherein three phase lines are connected between said source and said load and wherein a plurality of capacitors are connected between each pair of phase lines.

6. In combination: an electric system comprising an alternating current source of power, a load, and three phase lines connected between said source and said load, said system tending to exhibit changes in reactive power conditions therein when handling a dynamic reactive load; and a reactive power compensation control system for said electric power system comprising: a plurality of capacitor banks, each bank comprising at least one capacitor, for connection to each pair of phase lines between said source and said load; a plurality of switches, one for each capacitor and each including a pair of controlled charging and discharging rectifiers connected in inverse parallel relationship with each other and in series with said capacitor across said pair of phase lines, each switch being operable to connect its associated capacitor to its associated pair of phase lines to effect charging and discharging of said capacitor; and control means coupled to said power system between said source and said capacitor banks to operate said switches and comprising: a control circuit responsive to reactive power conditions in said power system resulting from said dynamic reactive load and from the affect of said capacitor, and an ON section and a RUN section; and a plurality of firing circuits operated by said control circuit for operating of said switches, one firing circuit being provided for each switch, and each firing circuit comprising a charge section and a discharge section; said control circuit being operable to cause said ON section to effect sequential operation of said charge sections and said charging rectifiers and to effect sequential charging of said capacitors, and said control circuit being responsive to said reactive power conditions to cause said RUN section to operate subsequent to sequential charging of said capacitors to operate said firing circuits to effect synchronous discharge and charge of said capacitor banks.

7. A combination according to claim 6 wherein each of said firing circuits includes means responsive to the magnitude and polarity of the voltage across its associated switch during operation of either said ON or said RUN sections to prevent operation of said switch regardless of said reactive power conditions while the voltage differential across said switch is beyond a predetermined range, and wherein each of said firing circuits further includes means to prevent operation of its associated switch during operation of said ON section unless the voltage across said switch is at a predetermined phase angle with respect to the applied voltage in the cycle.

8. A combination according to claim 7 including optical coupling means connected in circuit between said control circuit and said firing circuits for transmitting signal information from said control circuit to said firing circuits while maintaining a predetermined level of voltage isolation therebetween.

9. A combination according to claim 8 wherein said capacitor bank comprises a plurality of capacitors and wherein the capacitors in one bank operate simultaneously with each other.

* * * * *